United States Patent
Nicastro et al.

[11] 3,885,385
[45] May 27, 1975

[54] BASE DRAG REDUCTION

[75] Inventors: Lawrence N. Nicastro; John R. Munger, both of Huntsville, Ala.

[73] Assignee: The United States of America as represented by the Secretary of the Army, Washington, D.C.

[22] Filed: Dec. 22, 1972

[21] Appl. No.: 316,601

[52] U.S. Cl. .................................. 60/250; 60/254
[51] Int. Cl. .............................................. F02k 9/06
[58] Field of Search ............ 60/250, 254, 271, 207; 102/101, 49.3

[56] References Cited
UNITED STATES PATENTS

| | | | |
|---|---|---|---|
| 2,987,882 | 6/1961 | Nocke | 60/255 |
| 3,012,400 | 12/1961 | Corson | 60/271 |
| 3,402,894 | 9/1968 | Wynosky et al. | 60/271 |

FOREIGN PATENTS OR APPLICATIONS

| | | | |
|---|---|---|---|
| 1,071,581 | 6/1967 | United Kingdom | 60/271 |

*Primary Examiner*—Samuel Feinberg
*Attorney, Agent, or Firm*—Edward J. Kelly; Herbert Berl; Jack W. Voigt

[57] ABSTRACT

Means for reducing or eliminating the base drag of a rocket motor is provided by selected configurations of a drag reducing propellant. The drag reducing propellant is a slow burning propellant which is positioned within a rocket motor and burned to provide gases for relieving the partial vacuum experienced after completion of the boost or sustain propellant burning phase. At the end of the burning phase no gases are being ejected from the rocket nozzle. But the drag reducing propellant compensates for this condition by being a source for continued gas ejection whereby the partial vacuum is relieved and the base drag effect of a rocket motor is reduced or eliminated. The drag reducing propellant is tailored and configured for use in combination with a rocket motor having an end burning, start perforated, or cylindrical propellant grain. In an alternate design, the drag reducing propellant is employed in combination with a rocket motor where it is positioned between the rocket nozzle and the rocket shroud. When employed in this design, the drag reducing propellant is independent of the pressure inside the rocket motor case, a distinct advantage for certain combinations.

1 Claim, 5 Drawing Figures

PATENTED MAY 27 1975  3,885,385

BASE DRAG REDUCTION

BACKGROUND OF THE INVENTION

A basic solid propellant rocket motor includes a case for holding the solid propellant grain, generally, insulation between the propellant grain and the case, an exhaust nozzle through which the gases formed from the burning propellant grain are exhausted, and miscellaneous accessory items including a means for ignition, guidance and control equipment, and the like.

A propulsion vehicle can be designed with a single rocket motor or stage to provide thrust or it can be designed with a plurality of motors or stages with or without separation capabilities at various flight conditions. The remaining stage or stages can be subsequently burned to provide additional thrust. A widely used propulsion vehicle consists of two stages, a boost stage and a sustain stage. The boost stage provides thrust for a predetermined period of time which is generally followed by a coast phase. The coast phase is followed by a burning period of the sustain stage which may then be followed by another coast phase. The period of time when the boost stage burns out or the period of time when the sustain stage burns out has a problem which relates to the base drag. The problem and the term base drag is described in detail hereinbelow.

The base drag of a rocket or a missile is caused by a low pressure or a partial vacuum area behind the rocket. The partial vacuum is caused by air passing by non-streamlined surfaces, namely the surfaces of the rocket nozzle. This low pressure area at the base of the rocket occurs after completion of the boost or sustain propellant burning phase when no gases are being ejected from the rocket nozzle. Thus, the low pressure or partial vacuum causes an increase in the base drag during the coast phase of flight. This base drag accounts for up to 50 percent of the total missile drag (when coasting).

If the base drag phenomena can be controlled, desirable results can be achieved. Such results, as more accuracy in controlling of a missile's destination or impact point and achieving greater range of the missile are very desirable results which are essential for mission successes.

An object of this invention is to provide a means of reducing or eliminating base drag of a rocket motor or propulsion vehicle.

Another object is to provide a means for reducing or eliminating base drag in rockets having different grain configurations.

Another object is to provide a means for reducing or eliminating base drag in rockets to provide an increase in the range and to more precisely control the destination or the impact point of rockets.

SUMMARY OF THE INVENTION

Means for reducing or eliminating base drag of a rocket motor is provided by a selected configuration of a drag reducing propellant which is employed in combination with the solid propellant rocket motor to provide some gases for the continued exhausting through the nozzle during a coasting phase when no gases from the main rocket motor are being ejected. The continued gas ejection prevents the formation of the partial vacuum at the base of the rocket in the vicinity of the exhaust nozzle. The drag reducing propellant, a slow burning propellant, is employed in the form of a disc in the head end of an end burning rocket motor, in the form of slivers when a star perforated grain is employed in a rocket motor, and in the form of slivers when a cylindrical shaped grain is employed in a rocket motor. Where precise cut off and large pressure decays are necessary in the rocket motor, a separate drag reducing scheme is used which comprises utilizing the volume between the nozzle and shroud for containing the drag reducing propellant. In the described drag reducing scheme, the drag reducing propellant is ignited separately at the time of burn out or at the time of launch of the rocket.

The drag reducing propellant is selected from a fuel rich composite propellant and a fuel rich cellulose propellant. The fuel rich composite propellant is comprised of polybutadiene acrylic acid copolymer binder in amounts from about 65 to about 89 percent by weight, oxidizer selected from ammonium perchlorate and ammonium nitrate in amounts from about 10 to about 25 percent by weight, and a burning rate depressant in amounts from about 1 to about 10 percent by weight. The burning rate depressant includes organic or inorganic phosphate compounds. The fuel rich cellulose propellant is comprised of cellulose acetate in amounts from about 50 to about 75 percent by weight, nonenergetic plasticizers in amounts from about 15 to about 45 percent by weight, and oxidizer-energetic plasticizers in amounts from about 5 to about 10 percent by weight. Examples of the nonenergetic plasticizers include dibutyl phthalate and other nonvolatile organic liquids or low melting solids, especially the phthalate, adipate and sebacate esters and aryl phosphate. Examples of oxidizer-energetic plasticizers are nitroglycerine and other nitrate esters of trihydric alcohols.

DESCRIPTION OF THE PREFERRED EMBODIMENTS

Figure 1:
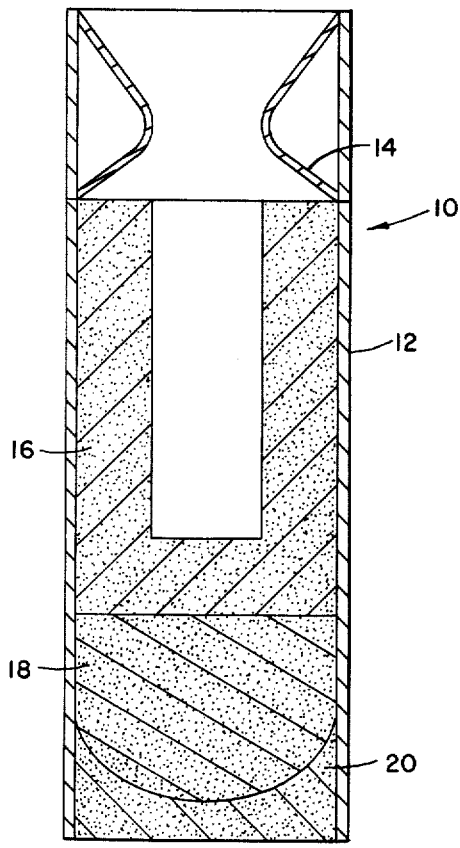
FIG. 1 is a sectional view, shown diagrammatically, of an end burning solid propellant rocket motor that contains a boost, a sustain, and a drag reducing propellant.

With reference to the drawing, FIG. 1, there is shown a solid propellant rocket motor 10 which includes a motor case 12 and a nozzle 14 affixed at the aft end of the motor case. A boost propellant 16, a sustain propellant 18, and a drag reducing propellant 20 are shown positioned within the case. In operation, the boost propellant is ignited to provide ignitial thrust for the rocket motor. The burning boost propellant functions to ignite the sustain propellant which provides sustaining thrust. The burning sustain propellant, in turn, functions to ignite the drag reducing propellant which provide gases for ejecting rearward of the nozzle during a coast period to relieve the partial vacuum formed by air passing by the non-streamlined surfaces of the rocket motor nozzle.

Figure 2:
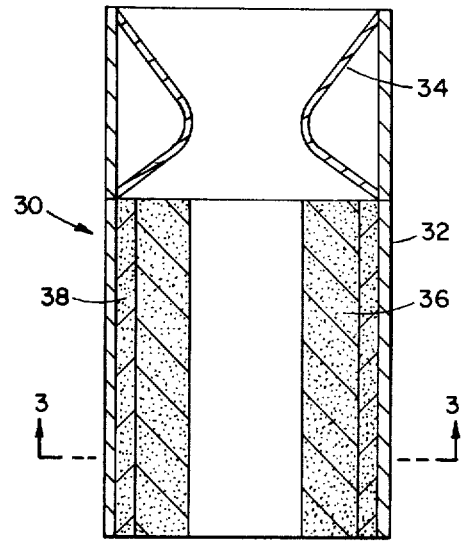
FIG. 2 is a sectional view, shown diagrammatically, of a star perforated grain solid propellant rocket motor that contains a boost and a drag reducing propellant.

With reference to the drawing, FIG. 2, there is shown a solid propellant rocket motor 30 which includes a motor case 32 and a nozzle 34 affixed at the aft end of the motor case. A star perforated boost propellant 36 and a drag reducing propellant 38 are shown positioned within the case. The drag reducing propellant is positioned and spaced along the periphery of the boost propellant grain in the place normally occupied by inert slivers used to normalize the thrust curve. The drag reducing propellant slivers performs the function of the inert slivers and the additionally described function set forth below. The drag reducing propellant is ignited by the burning star perforated boost propellant. After ignition the drag reducing propellant burns slowly to provide continued gas ejection through the exhaust nozzle after the boost propellant has burned up. The gas ejection taken place during the coast period to relieve the partial vacuum as previously described in another embodiment.

Figure 3:
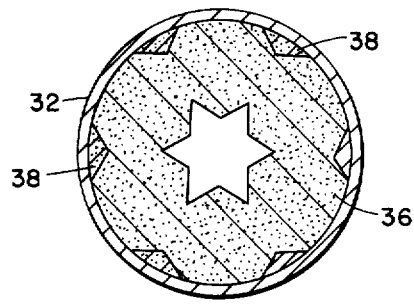
FIG. 3 is a cross sectional view—shown in full for clarity—taken along line 3—3 of FIG. 2.

With reference to the drawing, FIG. 3, there is shown a full cross sectional view of the propellant in the motor case of FIG. 2 with the same numerical designations being used for motor case 32, star perforated boost propellant 36, and the drag reducing propellant 38.

Figure 4:
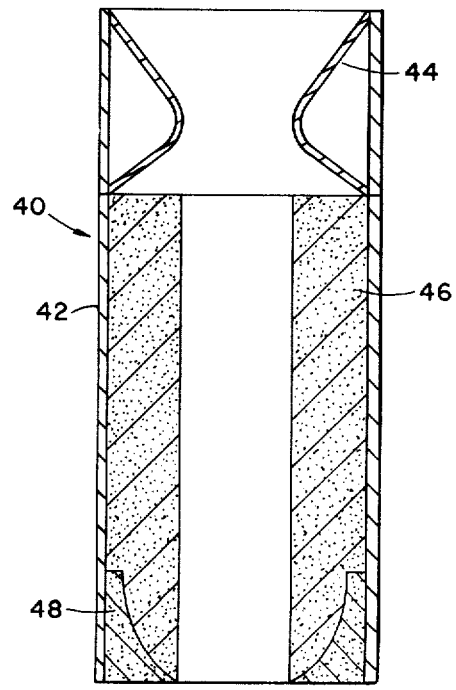
FIG. 4 is a sectional view, shown diagrammatically, of a cylindrical grain solid propellant rocket motor that contains a boost and a drag reducing propellant.

With reference to the drawing, FIG. 4, there is shown a solid propellant rocket motor 40 which includes a motor case 42 and a nozzle 44 affixed at the aft end of the motor case. A cylindrical boost propellant 46 and a drag reducing propellant 48 are shown positioned within the case. The drag reducing propellant is positioned in the place normally occupied by the head-end insulation. The drag reducing propellant is ignited by the burning cylindrical boost propellant. The drag reducing propellant burns slowly to provide continued gas ejection through the exhaust nozzle after the boost propellant has burned up. The gas ejection taken place during the coast period to relieve the partial vacuum as previously described in another embodiment.

Figure 5:
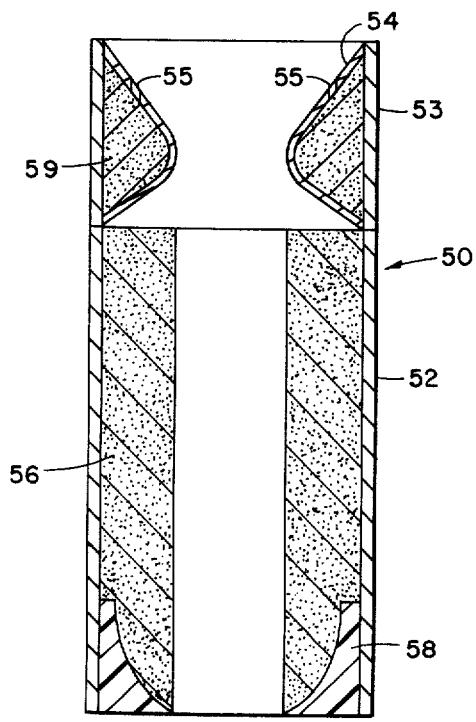
FIG. 5 is a sectional view, shown diagrammatically, of a solid propellant rocket motor that contains a boost propellant and a drag reducing propellant. The drag reducing propellant is positioned between the nozzle and the shroud.

With reference to the drawing, FIG. 5, there is shown a solid propellant rocket motor 50 which includes a motor case 52, a nozzle 54 affixed at the aft end of the motor case. A shroud 53 is shown extending over the exhaust nozzle. The shroud serves to extend the motor case over the exhaust nozzle and to enclose the exhaust nozzle. A cylindrical boost propellant 56 and head-end insulation 58 are shown positioned within the motor case. The drag reducing propellant 59 is shown positioned between the nozzle 54 and the shroud 53.

The embodiment depicted by FIG. 5 is especially suitable for use where precise cut off and large pressure decays are necessary in the rocket motor. The described type of rocket motor employs a separate ignition system (not shown) for the drag reducing propellant which is ignited separately at the time of burn out or at the time of launch. When the drag reducing propellant is ignited, gases from the burning drag reducing propellant are ejected through vents 55 to furnish gas ejection rearward of the nozzle during a coast period to relieve the partial vacuum formed by air passing by the non-streamlined surfaces of the rocket motor nozzle.

The drag reducing propellant may be selected from a fuel rich composite propellant and a fuel rich cellulose propellant. Typical formulations of each of the propellants are disclosed hereinabove. The criteria for the selection of either drag reducing propellant include: compatibility with boost and sustain propellant, bonding agents or adhesives employed for securing the drag reducing propellant, and environmental conditions for intended use. Other criteria for the selection of either drag reducing propellant would include knowledge of the required burning rate and corresponding rate of gas ejection for reducing the drag effect for a particular size rocket motor, flight time of rocket motor, and flight pattern of rocket motor.

The drag reducing propellant formulations of this invention can be pre-cast and later secured in place, cast in place, or cast and trimmed to shape and then secured in place. There would be some advantages for selecting the composite base formulation (e.g. containing the polybutadiene-acrylic acid as binder) for use with composite propellant, and also, there would be some advantages for selecting the cellulose base formulation for use with a single, double base, or modified composite double base propellant. One of the advantages would be better interface bonding between the drag reducing propellant and the boost or sustain propellant grain. Another advantage would be greater stability and less migration of ingredients which have a tendency to migrate (e.g. plasticizers, burning rate catalysts, and the like).

A particular combination or embodiment of this invention may have distinct advantages as discussed below. Since the combinations of this invention may be varied along with the manner or time of igniting the drag reducing propellant, many desirable performance capabilities or features can be readily available after the proper exercise of knowledge and skill by those skilled in the art. The discussions below will further explain some of the desirable features.

In a combination of an end burning propellant and the slow-burning drag reducing propellant where very rapid decay of pressure in the motor could cause the drag reducing propellant to be extinguished, a disc of the drag reducing propellant is positioned in accordance with FIG. 1 and provided with an igniter (not shown) to start the burning of the drag reducing propellant while the main propellant is still burning.

In a combination of a cylindrical grain and drag reducing propellant in sliver form, as depicted in FIG. 4, the drag reducing propellant can be tailored to replace the head end insulation since it contains relatively small amounts of oxidizer. The sliver should be so configured to prevent very fast pressure decay as discussed in the above paragraph for the embodiment of FIG. 1.

Other combinations of propellant grains and drag reducing propellants make it possible to achieve a wide variety of results. For example, where it may be desirable to delay ignition time of sustain propellant grain while at the same time maintaining control of the base drag effect, a drag reducing propellant grain can be positioned for ignition following the boost propellant grain burning phase. The drag reducing propellant, as it burns, would furnish gases for ejection through the nozzle to control drag during a programmed coasting phase. Another drag reducing propellant grain could be positioned for ignition following the sustain propellant burning phase. Ignition can be accomplished by a separate ignition means or ignition can be accomplished by the burning propellant adjacent the drag reducing propellant grain. Still other combinations of propellant and drag reducing propellant are indicated which may be advantageous for certain missions.

We claim:

1. In combination with a solid propellant rocket motor having a propellant grain configuration selected from an end-burning grain configuration, a star-perforated grain configuration, or a cylindrical grain configuration contained within a solid propellant rocket motor case, said motor case having a head-end and an aft-end; and an exhaust nozzle affixed to said motor case at the aft-end thereof; a drag reducing propellant having a predetermined configuration positioned within said case, said drag reducing propellant having the predetermined configuration for use with said propellant grain configuration selected, said drag reducing propellant being a fuel rich, slow burning propellant that is burned a coast period of an in-flight solid propellant rocket motor to provide gases for ejecting rearward of said exhaust nozzle to relieve a partial vacuum formed by air passing by the non-streamlined surfaces of said exhaust nozzle and to thereby eliminate the base drag of said in-flight rocket motor during said coast period, said drag reducing propellant selected from the composite propellant comprised of polybutadiene acrylic acid in amounts from about 65 to about 89 percent by weight; an oxidizer selected from ammonium perchlorate and ammonium nitrate in amounts from about 10 to about 25 percent by weight; and a burning rate depressant selected from an organic or inorganic phosphate compound in amounts from about 1 to about 10 percent by weight and the cellulose base propellant comprised of cellulose acetate in amounts from about 50 to about 75 percent by weight; an inert plasticizer selected from phthalate esters, adipate esters, sebacate esters, and aryl phosphate in amounts from about 15 to about 45 percent by weight; and oxidizer-energetic plasticizer selected from nitrate esters of trihydric alcohols in amounts from about 5 to about 10 percent by weight.

* * * * *